(12) United States Patent
Yano et al.

(10) Patent No.: US 11,491,845 B2
(45) Date of Patent: Nov. 8, 2022

(54) AIR-CONDITIONING APPARATUS FOR VEHICLE AND CONTROL METHOD OF THE SAME

(71) Applicant: MAZDA MOTOR CORPORATION, Hiroshima (JP)

(72) Inventors: Teruaki Yano, Hiroshima (JP); Masaru Terada, Hiroshima (JP); Yuya Taketa, Hiroshima (JP); Yoshihiro Koga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 133 days.

(21) Appl. No.: 17/048,037

(22) PCT Filed: Apr. 9, 2019

(86) PCT No.: PCT/JP2019/015481
§ 371 (c)(1),
(2) Date: Oct. 15, 2020

(87) PCT Pub. No.: WO2019/208207
PCT Pub. Date: Oct. 31, 2019

(65) Prior Publication Data
US 2021/0155076 A1 May 27, 2021

(30) Foreign Application Priority Data

Apr. 24, 2018 (JP) .............................. JP2018-082738

(51) Int. Cl.
*B60H 1/00* (2006.01)
(52) U.S. Cl.
CPC ................. *B60H 1/00849* (2013.01)
(58) Field of Classification Search
CPC ........................ B60H 1/00849; B60H 1/00835
(Continued)

(56) References Cited

U.S. PATENT DOCUMENTS 9,656,534 B2 * 5/2017 Wade ................. B60H 1/00828
11,260,722 B2 * 3/2022 Williams ........... B60H 1/00849
(Continued)

FOREIGN PATENT DOCUMENTS

JP  H03-72007 U   7/1991
JP  2002-370516 A 12/2002
(Continued)

OTHER PUBLICATIONS

International Search Report issued in PCT/JP2019/015481; dated Jun. 11, 2019.

*Primary Examiner* — Ko-Wei Lin
(74) *Attorney, Agent, or Firm* — Studebaker & Brackett PC (57) ABSTRACT

An air-conditioning apparatus for a vehicle and a control method of the same are provided to inhibit a closing degree of a door in closing the door from being insufficient, secure high quietness in a vehicle cabin immediately after the door is closed, and lower energy consumption of the vehicle. An air-conditioning apparatus for a vehicle includes an inside-outside air switching damper including a damper switching actuator, an air-conditioning control switch, a control unit, and door opening-and-closing sensors. The control unit includes two timers and a memory. When an IG switch is in an OFF state, the control unit sets the inside-outside air switching damper to an intermediate mode when the door becomes an open state, thereafter sequentially starts the timers when the door becomes a closed state, and returns the inside-outside air switching damper to a previous state to opening of the door after waiting until the timers expire.

5 Claims, 9 Drawing Sheets

(58) Field of Classification Search
USPC .................................................. 454/75, 70
See application file for complete search history.

(56) References Cited

U.S. PATENT DOCUMENTS

| | | | | |
|---|---|---|---|---|
| 2012/0077426 A1* | 3/2012 | Dage | ................. | B60H 1/00849 |
| | | | | 454/75 |
| 2014/0273786 A1* | 9/2014 | Wade | ................. | B60H 1/00735 |
| | | | | 454/75 |
| 2017/0158021 A1* | 6/2017 | Iacovoni | ............ | B60H 1/00835 |
| 2019/0143788 A1* | 5/2019 | Orihashi | ............ | B60H 1/00742 |
| | | | | 454/75 |
| 2021/0155076 A1* | 5/2021 | Yano | ................. | B60H 1/00849 |

FOREIGN PATENT DOCUMENTS

| | | |
|---|---|---|
| JP | 2005-254933 A | 9/2005 |
| JP | 2015-039995 A | 3/2015 |

* cited by examiner

AIR-CONDITIONING APPARATUS FOR VEHICLE AND CONTROL METHOD OF THE SAME

TECHNICAL FIELD

The present invention relates to an air-conditioning apparatus for a vehicle and a control method of the same.

BACKGROUND ART

A vehicle includes an air-conditioning apparatus for a vehicle for controlling an environment such as a temperature in a vehicle cabin. The air-conditioning apparatus for a vehicle has an inside-outside air switching damper for switching between an outside air introduction mode and an inside air circulation mode. When an occupant selects the outside air introduction mode by an air-conditioning control switch provided in the vehicle cabin, the posture of a valve body is set such that the inside-outside air switching damper may introduce outside air into the vehicle cabin. In a case where the inside air circulation mode is selected, the posture of the valve body is set such that inside air is introduced and circulated in the vehicle cabin.

Incidentally, in recent years, airtightness of a vehicle cabin tends to be further enhanced. In a vehicle in which the airtightness of the vehicle cabin is enhanced as described above, when a door is closed, an amount of air escaping from a door opening decreases due to a decrease in an opening area of the door, and the amount of air escaping through gaps in a vehicle body other than the door opening is very little. Thus, it becomes difficult for the door to be closed. As a result, a door-ajar state may occur.

Patent Literature 1 discloses a technique for inhibiting occurrence of such a door-ajar state in a case where a door is closed. The technique disclosed in Patent Literature 1 provides a configuration that enables the posture of a valve body of an inside-outside air switching damper to become an intermediate state as an intermediate posture between a posture for outside air introduction and a posture for inside air introduction. Further, the technique disclosed in Patent Literature 1 employs a configuration in which the inside-outside air switching damper may be set to the above intermediate state in a case where the door of a vehicle is opened and the posture of the valve body may be returned to a previous state (prior state) to opening of the door when the door is closed.

In a case where the technique disclosed in Patent Literature 1 is employed, the inside-outside air switching damper is set to the above intermediate state, an air flow passage is thereby formed between an inside of a vehicle cabin and an outside of the vehicle through the inside-outside air switching damper, and the door-ajar state in a case where the door is closed is inhibited from occurring.

However, in the technique disclosed in above Patent Literature 1, because the valve body of the inside-outside air switching damper is driven immediately after an occupant gets on the vehicle and closes the door, there is room for improvement in terms of quietness in the vehicle cabin. That is, immediately after the occupant gets on the vehicle and closes the door, the occupant who has got on the vehicle is more likely to feel quietness in the vehicle cabin than the outside of the vehicle, and it is not desirable that sound of a motor or the like driving the valve body be produced at this time.

Further, in a case where plural occupants get on the vehicle, doors are often closed at time gaps. In such a case, it is not desirable to drive the valve body every opening and closing of the doors because the driving leads to unnecessary consumption of energy of the vehicle.

CITATION LIST

Patent Literature

Patent Literature 1: Japanese Patent Laid-Open No. 2015-39995

SUMMARY OF INVENTION

The present invention has been made for solving an above problem, and an object thereof is to provide an air-conditioning apparatus for a vehicle and a control method of the same that may inhibit a closing degree of a door in closing the door from being insufficient, secure high quietness in a vehicle cabin immediately after the door is closed, and lower energy consumption of the vehicle.

An air-conditioning control apparatus for a vehicle of the present invention includes: an inside-outside air switching unit capable of switching among an outside air introduction mode for introducing air from an outside of a vehicle cabin of the vehicle, an inside air circulation mode for causing air in the vehicle cabin of the vehicle to circulate, and an intermediate mode for causing the outside of the vehicle cabin and an inside of the vehicle cabin of the vehicle to become a communicating state; a door opening-and-closing detection unit detecting an open-or-closed state of a door of the vehicle; an air-conditioning control switch accepting selection by an occupant of the vehicle about switching of the outside air introduction mode and the inside air circulation mode; and an air-conditioning controller accepting information about the detection from the door opening-and-closing detection unit and information about the selection from the air-conditioning control switch, the air-conditioning controller issuing a command of a mode to be executed to the inside-outside air switching unit, in which the air-conditioning controller issues a command to the inside-outside air switching unit to perform switching to the intermediate mode in a case where the door opening-and-closing detection unit detects an open state of the door and issues a command to the inside-outside air switching unit to return to an immediately previous mode to the issue of the command to perform switching to the intermediate mode after waiting until a time set in advance elapses in a case where the door becomes a closed state after the issue of the command to perform switching to the intermediate mode.

DESCRIPTION OF EMBODIMENT

An embodiment of the present invention will hereinafter be described with reference to drawings. Note that the embodiment described in the following is one aspect of the present invention, and the present invention is not limited to the following embodiment at all except inherent configurations of the present invention.

Note that in the drawings used in the following descriptions, "front", "rear", "up", "down", "right", and "left" are directions with respect to an occupant riding a vehicle as a reference.

1. Configuration of Vehicle 1

A configuration of a vehicle 1 according to this embodiment will be described by using FIG. 1.

Figure 1:
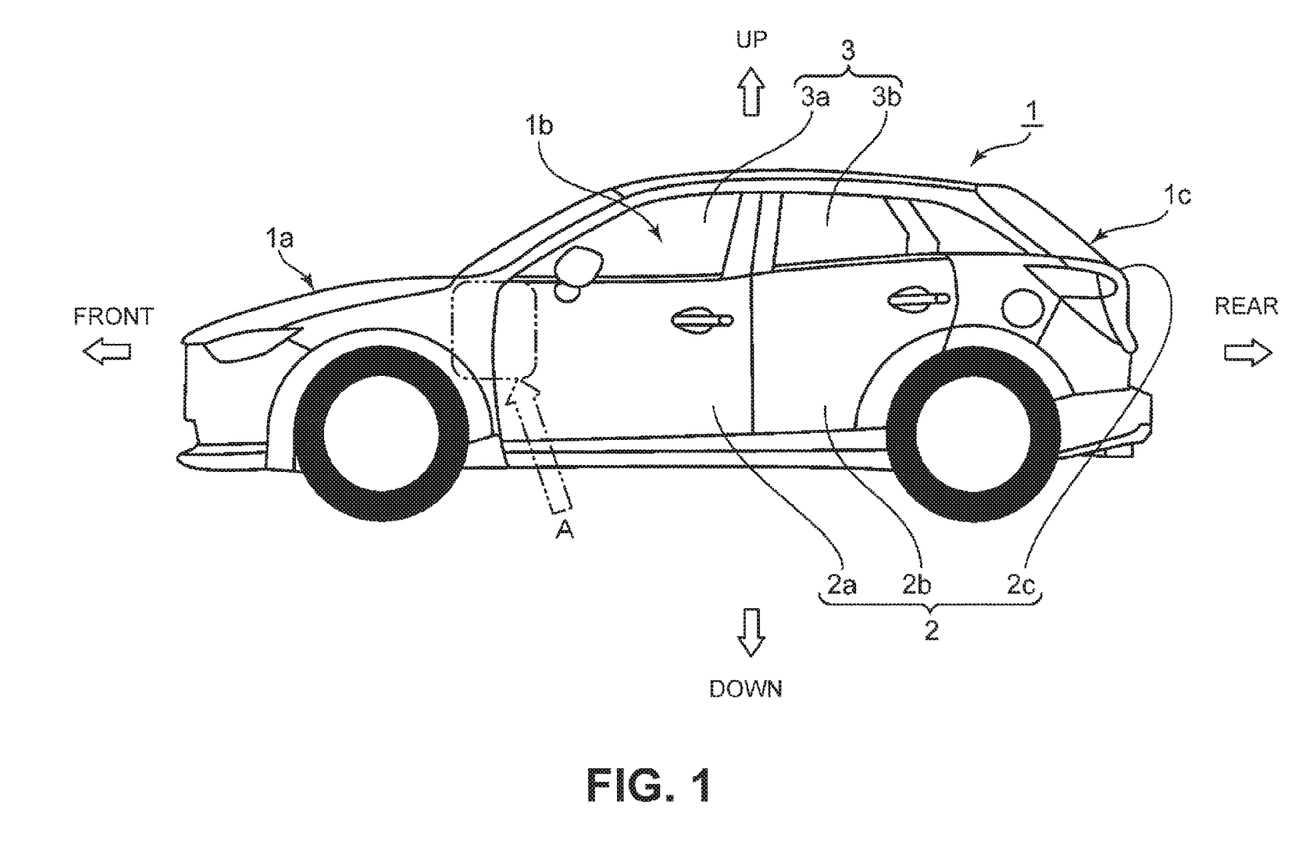
FIG. 1 is a schematic side view of a vehicle according to an embodiment of the present invention as seen from a left side.

As illustrated in FIG. 1, the vehicle 1 is configured with a vehicle front portion 1a on which a driving motive power source such as an engine and so forth are mounted, a vehicle cabin portion 1b in which the occupant rides, and a vehicle rear portion 1c in the rear of the vehicle cabin portion 1b. The vehicle cabin portion 1b of the vehicle 1 is provided with doors 2 (front doors 2a, rear doors 2b, and a rear gate 2c) opened and closed when the occupant gets on and off the vehicle 1 and baggage is put in and out.

Note that although FIG. 1 illustrates only a left side surface of the vehicle 1, the front door 2a and the rear door 2b are also provided to a right side surface on the opposite side.

Windows 3 (front windows 3a and rear windows 3b) opened and closed by operations by the occupant are respectively provided to the front doors 2a and the rear doors 2b.

2. Inside-Outside Air Switching Damper 4

Figure 2:
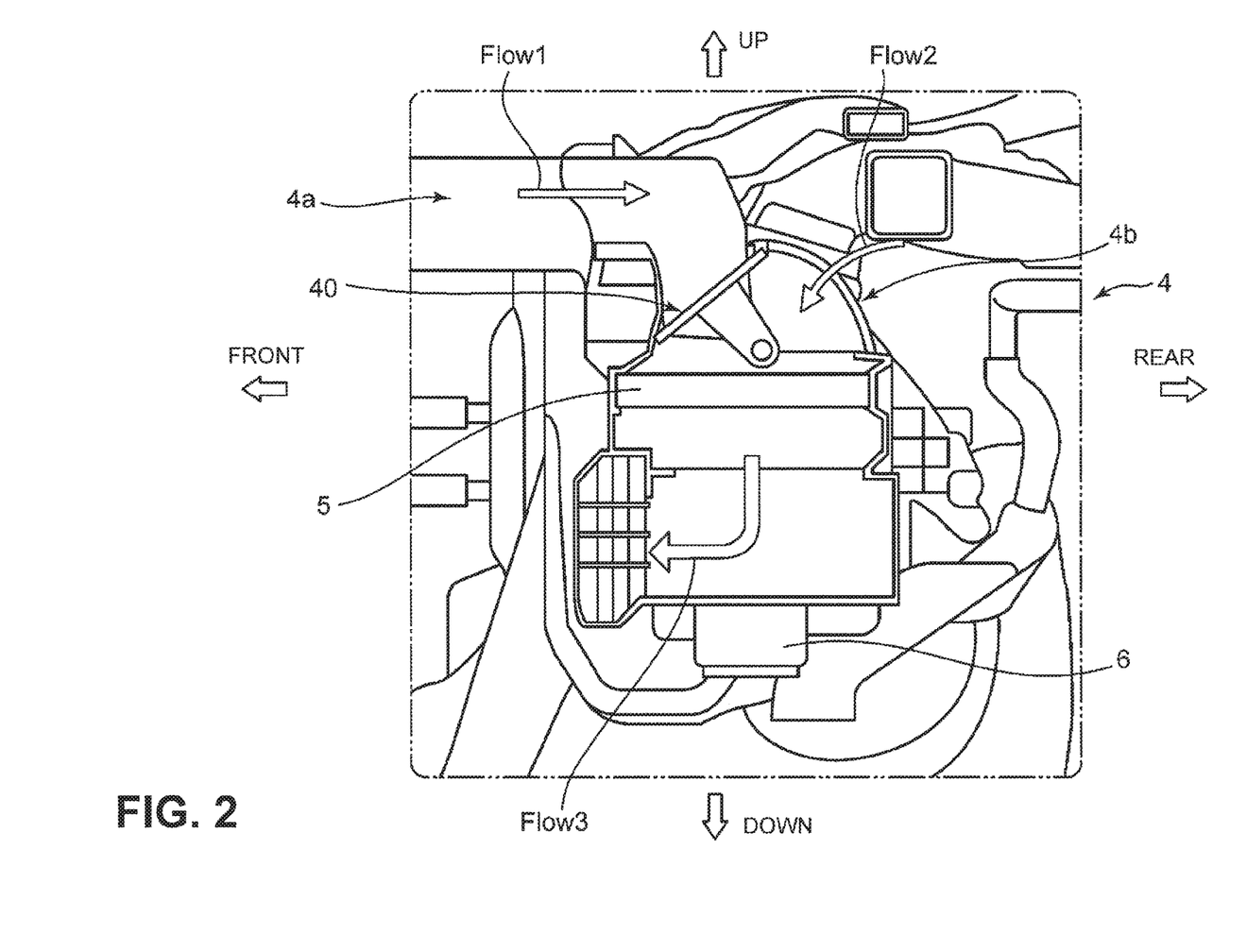
FIG. 2 is a schematic side view illustrating an A part in FIG. 1.
Figure 3:
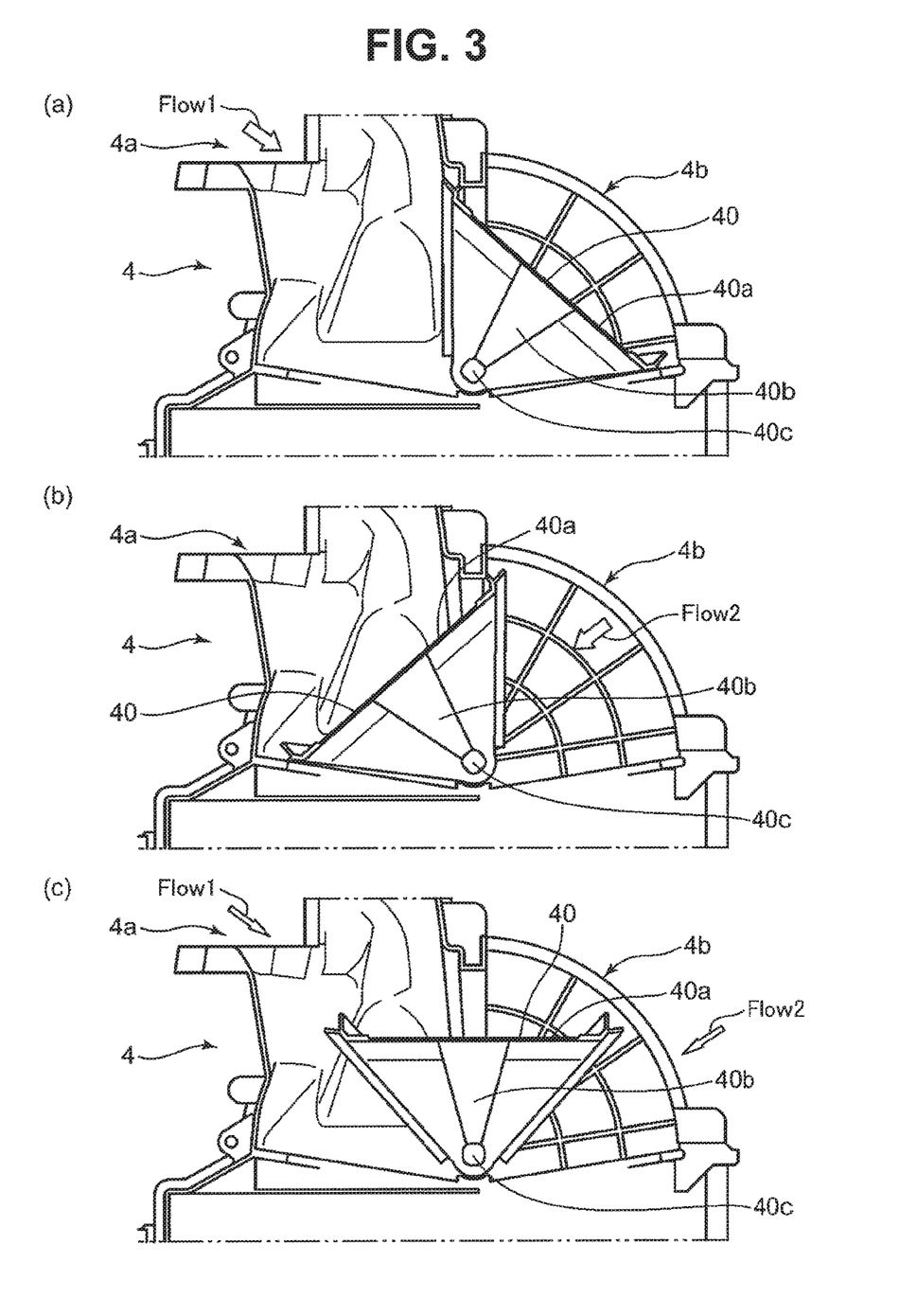
FIG. 3(a) is a schematic side view illustrating a state of an inside-outside air switching damper in an outside air introduction mode.
FIG. 3(b) is a schematic side view illustrating a state of the inside-outside air switching damper in an inside air circulation mode.
FIG. 3(c) is a schematic side view illustrating a state of the inside-outside air switching damper in an intermediate mode.

A configuration of an inside-outside air switching damper 4 provided to the vehicle 1 will be described by using FIG. 2 and FIG. 3. FIG. 2 is a schematic side view illustrating a configuration of the inside-outside air switching damper 4 mounted on an A part in FIG. 1. In FIG. 3, FIG. 3(a) is a schematic side view illustrating a state of the inside-outside air switching damper 4 in a case where an outside air introduction mode is selected, FIG. 3(b) is a schematic side view illustrating a state of the inside-outside air switching damper 4 in a case where an inside air circulation mode is selected, and FIG. 3(c) is a schematic side view illustrating a state of the inside-outside air switching damper 4 in a case where an intermediate mode is selected.

As illustrated in FIG. 2, the inside-outside air switching damper 4 includes an outside air introduction port 4a for taking in air from the outside (front) of the vehicle 1 and an inside air introduction port 4b for taking in air from an inside portion of the vehicle cabin portion 1b.

The inside-outside air switching damper 4 includes a valve body 40 in a merging portion of a path continuous with the outside air introduction port 4a and a path continuous with the inside air introduction port 4b. As illustrated in FIG. 3(a) to FIG. 3(c), the valve body 40 has a plate-like body 40a and a support arm 40b provided below that. The plate-like body 40a and the support arm 40b are capable of integrally rotating around a support shaft 40c as a rotation center, the support shaft 40c supporting a lower portion of the support arm 40b.

Referring to FIG. 2 again, a filter 5 and a blower fan 6 are attached to a lower side of the inside-outside air switching damper 4. During driving of the blower fan 6, outside air Flow1 as air of an outside portion of the vehicle or inside air Flow2 as air of an inside portion of a vehicle cabin portion 1b is introduced into the inside-outside air switching damper 4 in accordance with a state of the valve body 40. Then, the introduced outside air Flow1 or inside air Flow2 is subjected to air conditioning via an A/C (air conditioner) (not illustrated) including the filter 5 and an evaporator and so forth and is thereafter blown into the vehicle cabin portion 1b as conditioned air Flow3. Note that "blow" herein means blowing air out.

As illustrated in FIG. 3(a), in a case where the outside air introduction mode is selected, the plate-like body 40a of the valve body 40 takes a posture to block the inside air introduction port 4b. Accordingly, in a case where the outside air introduction mode is selected, only the outside air Flow1 is introduced into the inside-outside air switching damper 4 through the outside air introduction port 4a.

Next, as illustrated in FIG. 3(b), in a case where the inside air circulation mode is selected, the plate-like body 40a of the valve body 40 takes a posture to block the outside air introduction port 4a. Accordingly, in a case where the inside air circulation mode is selected, only the inside air Flow2 is introduced into the inside-outside air switching damper 4 through the inside air introduction port 4b.

Next, as illustrated in FIG. 3(c), in a case where the inside-outside air switching damper 4 is set to the intermediate mode, the plate-like body 40a of the valve body 40 takes a posture in an intermediate position between the posture in the outside air introduction mode and the posture in the inside air circulation mode. Accordingly, the outside air introduction port 4a and the inside air introduction port 4b become a communicating state. Thus, a flow path of air is formed between a space of the vehicle cabin portion 1b and the outside of the vehicle cabin.

Note that switching between the outside air introduction mode and the inside air circulation mode among three modes to which the inside-outside air switching damper 4 may be set is executed by an operation by the occupant for an air-conditioning control switch 8 provided in the vehicle cabin portion 1b. This will be described later.

3. Opening and Closing of Doors in Vehicle 1

Figure 4:
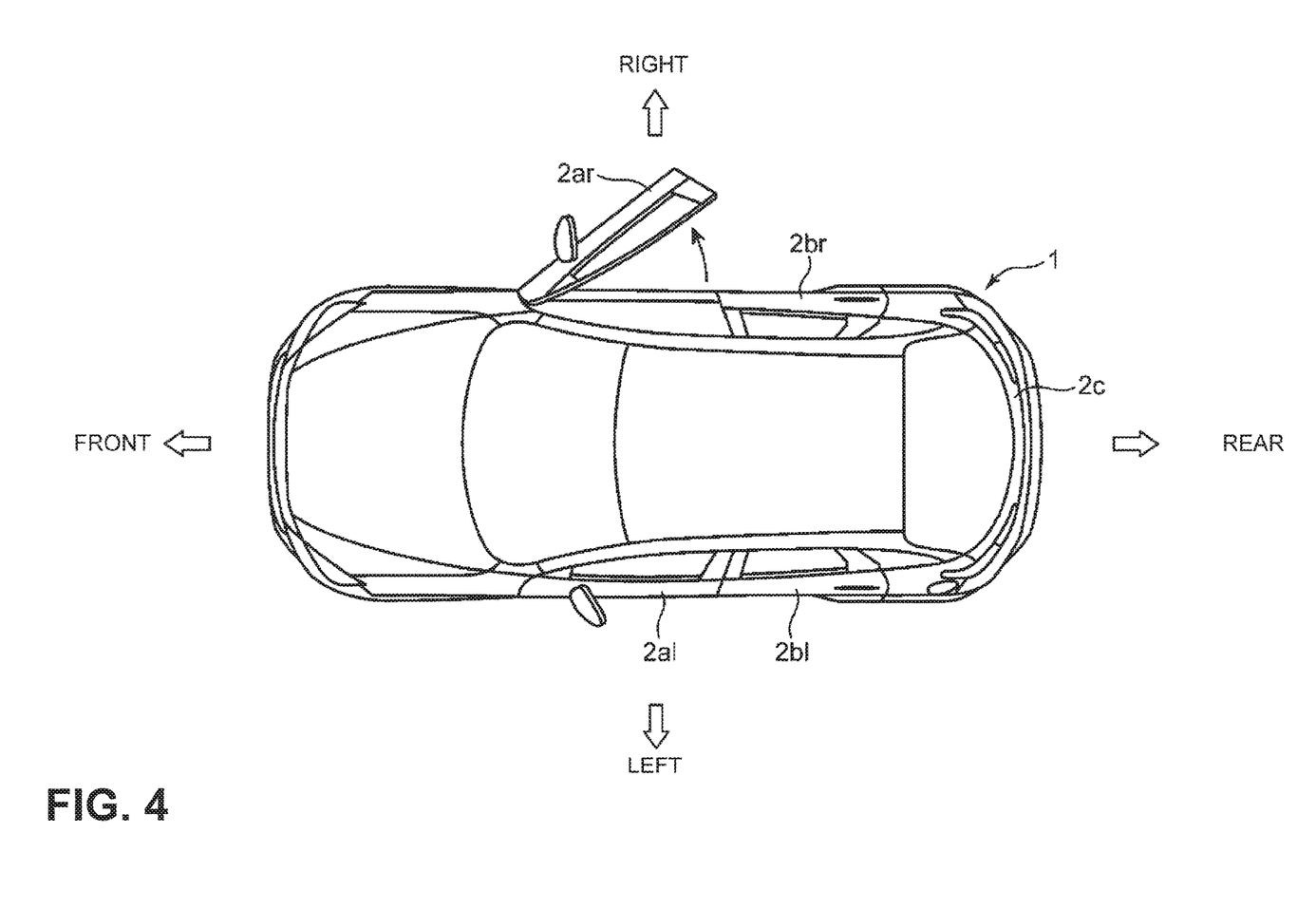
FIG. 4 is a schematic plan view illustrating the vehicle in which a door on a driver seat side is in an open state.

Opening and closing of the doors 2 in the vehicle 1 will be described by using FIG. 4. FIG. 4 is a schematic plan view illustrating a state of the vehicle 1 in which a door 2ar on a driver seat side is in an open state.

As illustrated in FIG. 4, in the vehicle 1, doors 2ar, 2al, 2br, and 2bl are opened and closed when occupants get on and off the vehicle 1. Further, when baggage is put in and out with respect to the vehicle 1, the rear gate 2c is opened and closed.

Here, in a case where plural occupants get on and off the vehicle 1 or a case where the occupant puts in and out the baggage placed in a rear portion of the vehicle cabin portion 1b, the doors 2ar, 2al, 2br, and 2bl and the rear gate 2c may be opened and closed with time gaps (that is, at different timings).

Note that in the vehicle 1 according to this embodiment, a door opening-and-closing sensor is provided to a support portion of each of the doors 2ar, 2al, 2br, and 2bl and the rear gate 2c.

4. Configuration of Air-Conditioning Control Switch 8

Figure 5:
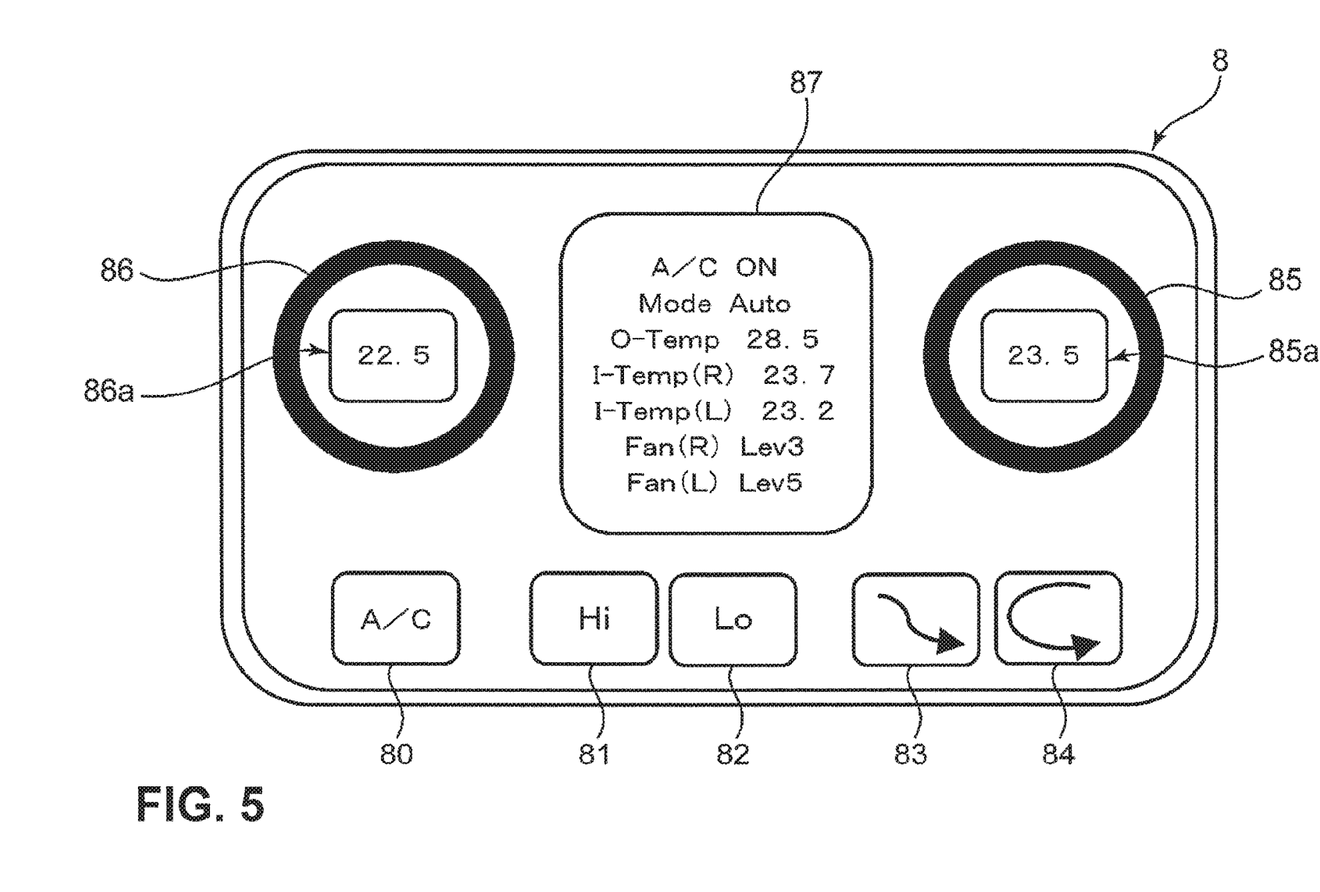
FIG. 5 is a schematic diagram illustrating a configuration of an air-conditioning control switch provided in a vehicle cabin portion.

A description will be made about a configuration of the air-conditioning control switch 8 provided to a dashboard in the vehicle cabin portion 1b by using FIG. 5. FIG. 5 is a schematic diagram illustrating the configuration of the air-conditioning control switch 8.

As illustrated in FIG. 5, the air-conditioning control switch 8 includes an A/C (air conditioner) switch 80, airflow amount switches 81 and 82, an outside air introduction switch 83, an inside air circulation switch 84, set temperature switching dials 85 and 86, and an air-conditioning information display 87.

The A/C switch 80 is a switch by which the occupant selects whether or not the A/C is driven. When the A/C switch 80 is pushed once, the A/C becomes an ON state, and when the A/C switch 80 is pushed again, the A/C becomes an OFF state.

Note that in a state where the A/C switch 80 is set to the ON state, an automatic mode is set as an initial state.

The airflow amount switches 81 and 82 are switches by which the occupant adjusts the airflow amount. When the airflow amount switch 81 is pushed, the airflow amount stepwise becomes higher in accordance with the number of pushes. Conversely, when the airflow amount switch 82 is pushed, the airflow amount stepwise becomes lower in accordance with the number of pushes.

Note that in a case where an operation of the airflow amount switch 81 or 82 is performed after the occupant turns the A/C switch 80 to the ON state, the automatic mode is canceled.

The outside air introduction switch 83 is a switch by which the outside air introduction mode is selected in a case where the occupant pushes the switch. The inside air introduction switch 84 is a switch by which the inside air circulation mode is selected in a case where the occupant pushes the switch. Either one of the outside air introduction switch 83 and the inside air introduction switch 84 is selected by the occupant, and the modes may thereby alternatively be switched.

Note that in a case where an operation of the outside air introduction switch 83 or the inside air introduction switch 84 is performed after the occupant turns the A/C switch 80 to the ON state, the automatic mode is canceled.

The set temperature switching dial 85 is a dial for performing a temperature setting for a right side (on the driver seat side in a case of a right-hand drive vehicle and on a passenger seat side in a case of a left-hand drive vehicle) in the vehicle cabin portion 1b. A set temperature display unit 85a is provided to the set temperature switching dial 85 and displays a present set temperature.

Similarly, the set temperature switching dial 86 is a dial for performing a temperature setting for a left side (on the passenger seat side in a case of a right-hand drive vehicle and on the driver seat side in a case of a left-hand drive vehicle) in the vehicle cabin portion 1b. A set temperature display unit 86a is also provided to the set temperature switching dial 86 and displays a present set temperature.

The air-conditioning information display 87 is arranged between the set temperature switching dial 85 and the set temperature switching dial 86 and displays a state of whether or not the A/C is in the ON state, a state of whether or not the A/C is in the automatic mode, detected temperatures, and the airflow amount of a fan.

Figure 6:
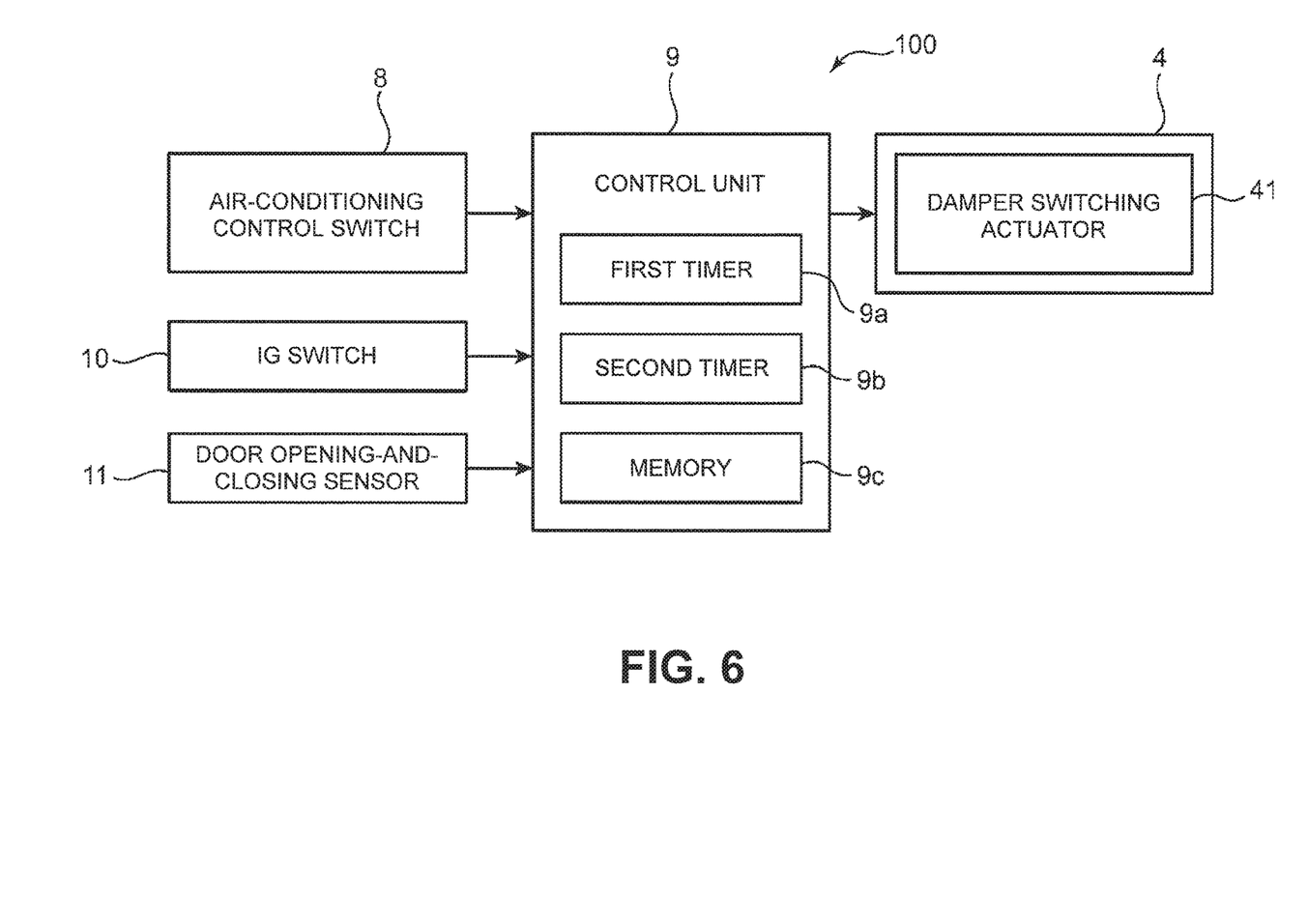
FIG. 6 is a block diagram illustrating a control configuration related to an air-conditioning apparatus for a vehicle.

5. Control Configuration Related to Air-Conditioning Apparatus 100 for Vehicle A description will be made about a control configuration related to an air-conditioning apparatus 100 for a vehicle by using FIG. 6. FIG. 6 is a block diagram illustrating the control configuration related to the air-conditioning apparatus 100 for a vehicle.

As illustrated in FIG. 6, the air-conditioning apparatus 100 for a vehicle according to this embodiment includes a control unit 9, the air-conditioning control switch 8, door opening-and-closing sensors 11, the inside-outside air switching damper 4 including a damper switching actuator 41, and an IG (ignition) switch 10 for starting an engine.

The control unit 9 has a microprocessor configured with a CPU, a ROM, a RAM, and so forth. Further, as illustrated in FIG. 6, the control unit 9 includes a first timer 9a, a second timer 9b, and a memory 9c.

The first timer 9a is a timer in which a time from a start of time measurement (that is, measurement of time) to expiration (that is, a state where time is up or an end) is in advance set to Ta. The second timer 9b is a timer which is configured to start time measurement at a time point when the first timer 9a finishes the time measurement and in which a time from a start of the time measurement to expiration is in advance set to Tb.

Here, in the air-conditioning apparatus 100 for a vehicle according to this embodiment, Ta and Tb are set so as to satisfy the following relationship.

$$Ta < Tb \qquad \text{(Formula 1)}$$

The term Ta is set to a value within a range of 3 to 7 sec. (for example, 5 sec.), and the term Tb is set to 20 to 40 sec. (for example, 30 sec.).

Note that a set value of Ta denotes a time period in which the occupant sensitively feels quietness immediately after the occupant gets on the vehicle 1 and closes the door 2 and is a value defined experimentally and empirically.

Note that a set value of Tb denotes a time period needed for the other occupants to get on the vehicle after an arbitrary occupant gets on the vehicle 1 and is also a value defined experimentally and empirically. Note that as for Tb, the control unit 9 may monitor the using situation of the vehicle and thereby performs adjustment such that Tb becomes an optimal value. In such a case, AI technology may be used.

Referring to FIG. 6 again, to the control unit 9, information from the air-conditioning control switch 8, ON/OFF information from the IG switch 10, information about opening and closing of the doors 2 from the door opening-and-closing sensors 11, and so forth are input.

Note that as described above, the door opening-and-closing sensor 11 is provided to the support portion of each of the doors 2ar, 2al, 2br, and 2bl and the rear gate 2c.

The control unit 9 executes driving control of the damper switching actuator 41 as needed based on each kind of information input as described above.

Note that the damper switching actuator 41 is not illustrated in FIG. 2 or FIG. 3 but is provided for driving the valve body 40. Further, based on a command from the control unit 9 to the damper switching actuator 41, the inside-outside air switching damper 4 is alternatively switched to any one of the outside air introduction mode, the inside air circulation mode, and the intermediate mode.

6. Air-Conditioning Control Method

Figure 7:
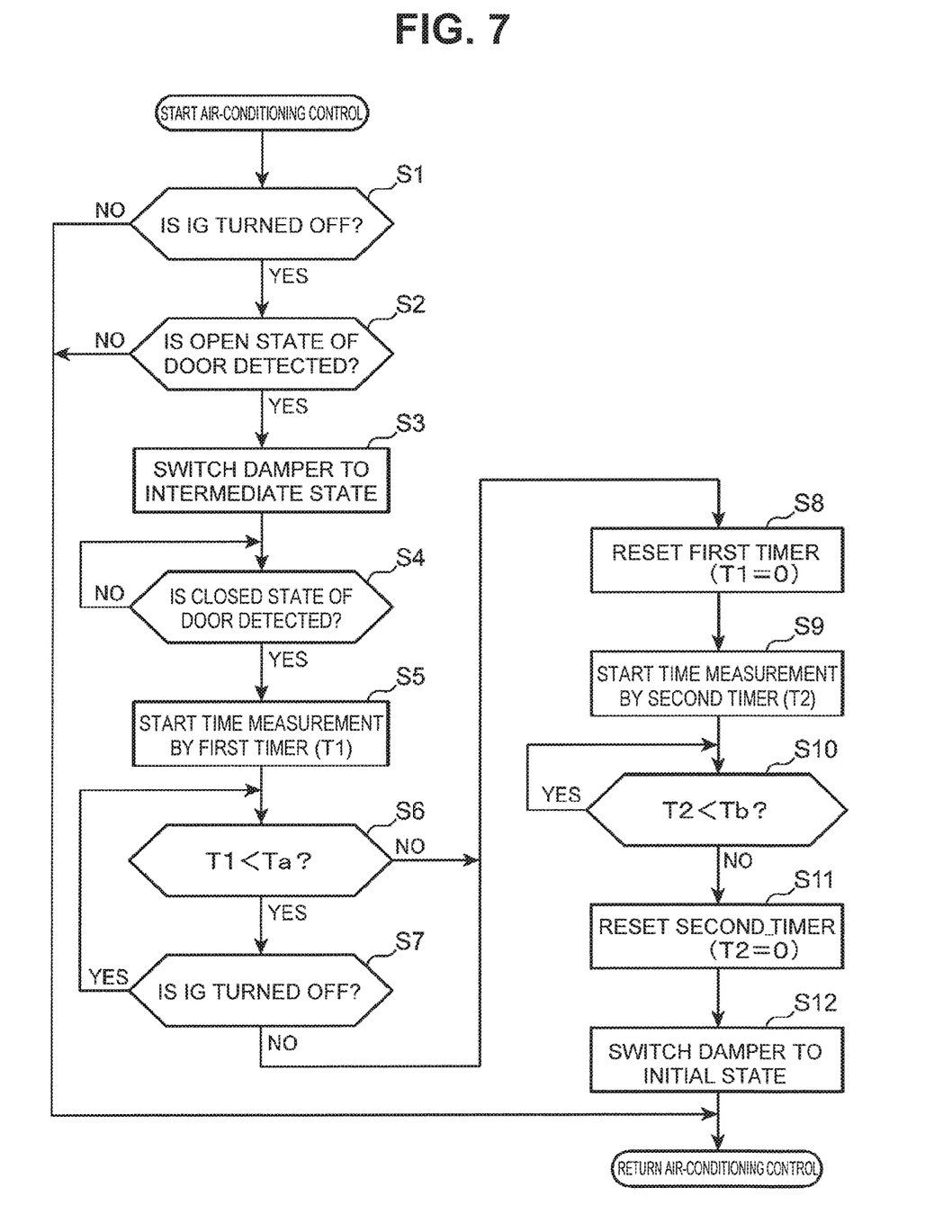
FIG. 7 is a flowchart illustrating an air-conditioning control method executed by a control unit according to the embodiment of the present invention.

An air-conditioning control method executed by the control unit 9 will be described by using FIG. 7 to FIG. 9. FIG. 7 is a flowchart illustrating the air-conditioning control method executed by the control unit 9, and FIG. 8 and FIG.

9 are time charts each of which illustrates one example of the air-conditioning control method.

As illustrated in FIG. 7, in air-conditioning control, the control unit 9 first determines whether or not the IG switch 10 is in an OFF state (step S1). In a case where it is determined that the IG switch 10 is in an ON state (step S1: No), the air-conditioning control is returned to a start.

On the other hand, in a case where it is determined that the IG switch is in the OFF state (step S1: Yes), the control unit 9 next determines whether or not the door 2 is in the open state (step S2). Here, in this embodiment, the door 2 to be a target of a determination in step S2 is any one door of the doors 2ar, 2al, 2br, and 2bl. In a case where it is determined that all the doors 2 are in a closed state (step S2: No), the air-conditioning control is returned.

On the other hand, in a case where it is determined that one door 2 is in the open state (step S2: Yes), the control unit 9 issues a command to the damper switching actuator 41 to switch the inside-outside air switching damper 4 to the intermediate mode (step S3).

Note that although not illustrated in FIG. 7, in executing step S3, the control unit 9 stores, in the memory 9c, information about an immediately previous mode to switching to the intermediate mode, that is, a mode (the outside air introduction mode or the inside air circulation mode) input to the air-conditioning control switch 8 by the occupant before switching to the intermediate mode.

After execution of step S3, the control unit 9 determines whether or not the one door of the doors 2 is closed (step S4). Until it is determined that the one door of the doors 2 is closed, the control unit 9 stands by in this state (step S4: No).

In a case where it is determined that the one door of the doors 2 is closed (step S4: Yes), the control unit 9 starts the time measurement by the first timer 9a (step S5). In a case where a counted time T1 by the first timer 9a does not reach the time Ta set in advance (step S6: Yes), the control unit 9 checks that the IG switch 10 is maintained in the OFF state (step S7: Yes), continues a determination in step S6, and stands by until the time Ta elapses.

In a case where it is determined in the determination in step 6 that the counted time T1 reaches the time Ta (step S6: No) or it is determined that in a determination in step S7 that the IG switch 10 is turned ON (step S7: No), the control unit 9 resets the first timer 9a (step S8) and next starts the time measurement by the second timer 9b (step S9).

The control unit 9 stands by until a counted time T2 by the second timer 9b reaches the time Tb set in advance (step S10: Yes).

Then, in a case where it is determined that the counted time T2 by the second timer 9b reaches the time Tb (step S10: No), the control unit 9 resets the second timer 9b (step S11), reads out mode information stored in the memory 9c, and issues a command to the damper switching actuator 41 to switch the mode of the inside-outside air switching damper 4 to the immediately previous mode to execution of step S3 (step S12).

As described above, the air-conditioning control executed by the control unit 9 is finished.

(i) First Control Example

Next, a description will be made about control in the air-conditioning control described by using FIG. 7, in which the time measurement by the second timer 9b is started after the first timer 9a expires (step S6: No) and the mode of the inside-outside air switching damper 4 is thereafter returned, by using the time chart of FIG. 8.

Figure 8:
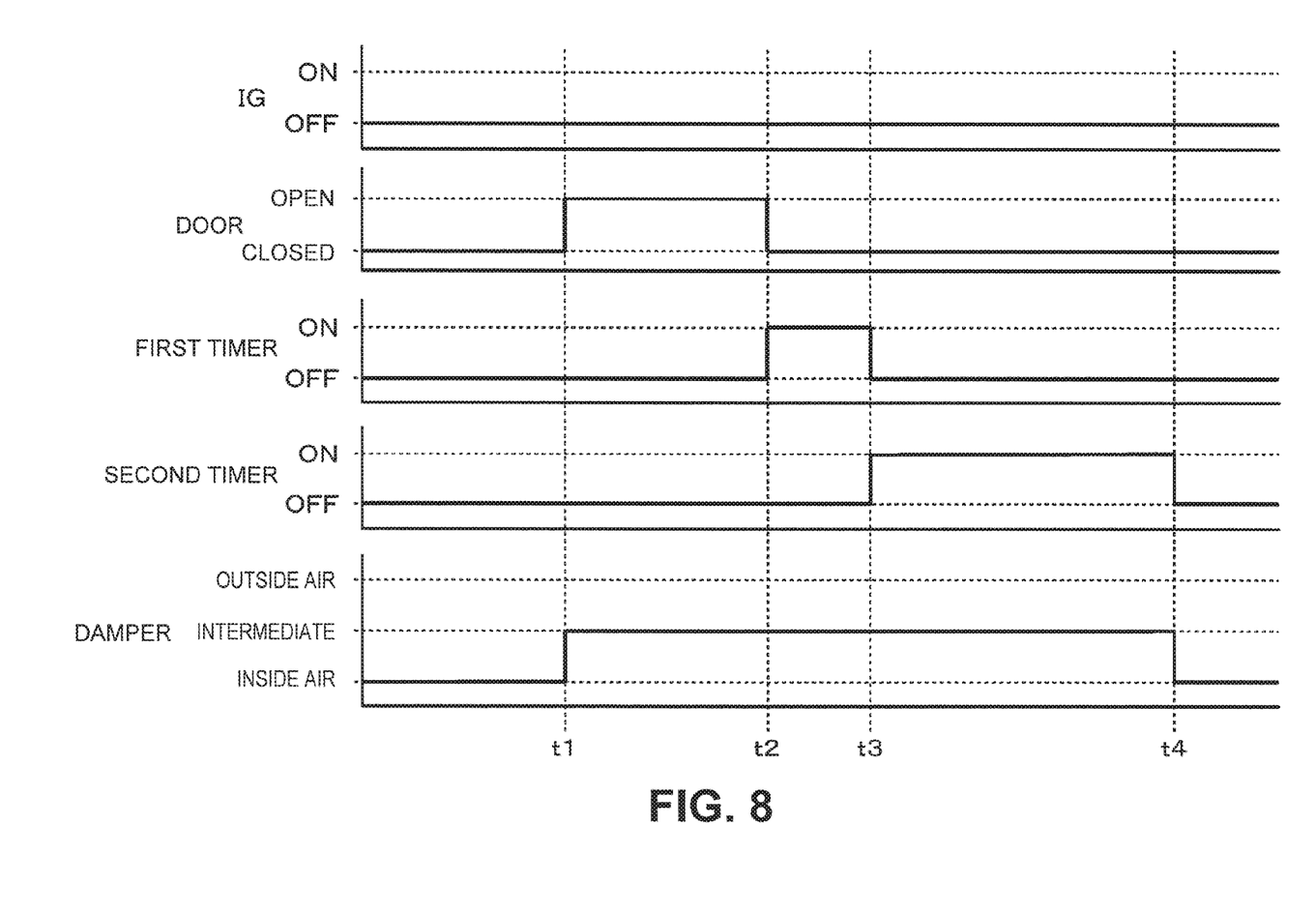
FIG. 8 is a time chart illustrating one example of the air-conditioning control method.

As illustrated in FIG. 8, in this example, the IG switch 10 is maintained in the OFF state. Then, at a timing t1, the one door of the doors 2 becomes the open state. The control unit 9 detects this and then switches the inside-outside air switching damper 4 to the intermediate mode.

Note that in the example illustrated in FIG. 8, at a time point before the timing t1, the inside-outside air switching damper 4 is set to the inside air circulation mode.

Next, a state is maintained where the inside-outside air switching damper 4 is set to the intermediate mode, and the one door of the doors 2 is closed at a timing t2. The control unit 9 detects this, then first turns ON the first timer 9a, and starts the time measurement. The first timer 9a expires at a timing t3. That is, a time period from the timing t2 to the timing t3 is the time Ta set in advance for the first timer 9a.

At the timing t3 when the first timer 9a expires, the control unit 9 turns ON the second timer 9b and starts the time measurement. The second timer 9b expires at a timing t4. That is, a time period from the timing t3 to the timing t4 is the time Tb set in advance for the second timer 9b.

At the timing t4 when the second timer 9b expires, the control unit 9 returns the inside-outside air switching damper 4 to the inside air circulation mode.

(ii) Second Control Example

Next, a description will be made about control in the air-conditioning control described by using FIG. 7, in which the IG switch 10 becomes the On state in step S7 (step S7: No) before the first timer 9a expires, the time measurement by the second timer 9b is started, and the mode of the inside-outside air switching damper 4 is thereafter returned, by using the time chart of FIG. 9. Note that the time chart illustrated in FIG. 9 is the same as the first control example until the timing t2, and a description thereof will not be made in the following.

Figure 9:
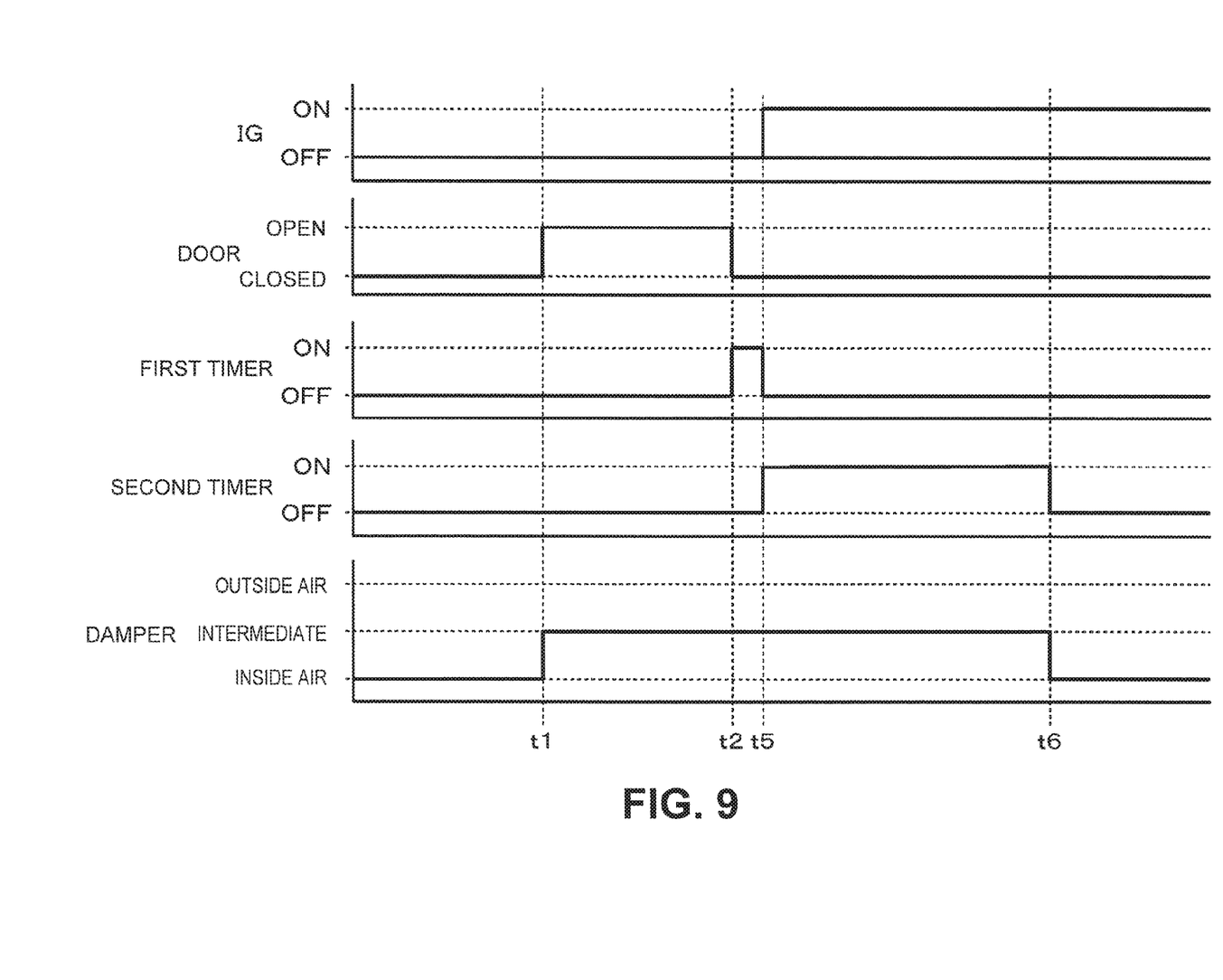
FIG. 9 is a time chart illustrating one example of the air-conditioning control method.

As illustrated in FIG. 9, in a case where it is detected that the IG switch 10 becomes the ON state at a timing t5, the control unit 9 finishes the time measurement by the first timer 9a before completion and starts the time measurement by the second timer 9b. This is because in a case where the occupant who has rode the vehicle 1 turns ON the IG switch 10, necessity for maintaining quietness in the vehicle cabin portion 1b is considered to become low.

The second timer 9b expires at a timing t6. In this example, a time period from the timing t5 to the timing t6 is the time Tb set in advance for the second timer 9b.

At the timing t6 when the second timer 9b expires, the control unit 9 returns the inside-outside air switching damper 4 to the inside air circulation mode.

Note that in the above first control example and second control example, although the inside-outside air switching damper 4 is returned to the inside air circulation mode at the timing t4 and the timing t6, this is for switching to the same mode as a previous mode to the timing t1. Consequently, in a case where the previous mode to the timing t1 is the outside air introduction mode, the inside-outside air switching damper 4 is returned to the outside air introduction mode at the timings t4 and t6.

[Modification]

In the above embodiment, as described by using FIG. 3(c), a state where the plate-like body 40a takes a generally horizontal posture is described as one example of the intermediate mode; however, the present invention is not limited to this. It is sufficient that the posture of the plate-like body 40a is controlled such that the outside air introduction port 4a and the inside air introduction port 4b become a state where they communicate with each other.

Further, in the above embodiment, a configuration is employed in which mode switching is performed by rotation of the plate-like body 40a in the inside-outside air switching damper 4; however, the present invention is not limited to this. A so-called rotary damper structure may be employed. In addition, as another modification of the inside-outside air switching damper 4, a configuration may be employed in which a damper whose opening is individually adjusted to three stages (that is, fully closed, half open, and fully open) is provided to each of the outside air introduction port 4a and the inside air introduction port 4b.

Further, in the above embodiment, the control unit 9 includes the two timers 9a and 9b and starts the time measurement by the second timer 9b after waiting until the time measurement by the first timer 9a finishes; however, the present invention is not limited to this. For example, it is possible that the control unit includes only one timer and the mode of the inside-outside air switching damper is returned to the prior mode at a time point when the one timer expires.

Note that in a case of a configuration in which only one timer is included and in a case where the above second control example is executed, a process of changing the time to be measured by the timer is performed at a timing when information that the IG switch 10 becomes the ON state is input, and control similar to the above may thereby be executed.

Further, in the above embodiment, in the flowchart of FIG. 7, in a case where it is determined that the IG switch 10 is turned ON in the determination in step S7 (step S7: No), time measurement by a first timer T1 is finished, and time measurement by a second timer T2 is started (step S9). Such settings may inhibit occurrence of a circumstance in which the inside-outside air switching damper 4 is driven every opening and closing of the door 2 even when plural occupants ride the vehicle 1. Thus, the above embodiment has an advantage in terms of lowering energy consumption of the vehicle 1, securing durability of the damper switching actuator 41, and so forth.

However, in a case where no trouble occurs to electric power of the vehicle, durability of the damper switching actuator, or the like, the mode of the inside-outside air switching damper may be switched to the immediately previous mode to execution of step 3 in FIG. 7 without performing the time measurement by the second timer when the IG switch is turned ON in the middle of the time measurement by the first timer T1.

Conclusion of Embodiment

The above embodiment will be summarized as follows.

An air-conditioning apparatus for a vehicle according to the above embodiment includes: an inside-outside air switching unit capable of switching among an outside air introduction mode for introducing air from an outside of a vehicle cabin of the vehicle, an inside air circulation mode for causing air in the vehicle cabin of the vehicle to circulate, and an intermediate mode for causing the outside of the vehicle cabin and an inside of the vehicle cabin of the vehicle to become a communicating state; a door opening-and-closing detection unit detecting an open-or-closed state of a door of the vehicle; an air-conditioning control switch accepting selection by an occupant of the vehicle about switching of the outside air introduction mode and the inside air circulation mode; and an air-conditioning controller accepting information about the detection from the door opening-and-closing detection unit and information about the selection from the air-conditioning control switch, the air-conditioning controller issuing a command of a mode to be executed to the inside-outside air switching unit, in which the air-conditioning controller issues a command to the inside-outside air switching unit to perform switching to the intermediate mode in a case where the door opening-and-closing detection unit detects an open state of the door and issues a command to the inside-outside air switching unit to return to an immediately previous mode to the issue of the command to perform switching to the intermediate mode after waiting until a time set in advance elapses in a case where the door becomes a closed state after the issue of the command to perform switching to the intermediate mode.

In the air-conditioning apparatus for a vehicle according to the above aspect, the inside-outside air switching unit is set to the intermediate mode when the door is opened, and the intermediate mode is maintained also when the door is closed. Thus, even in a vehicle with high air-tightness of a vehicle cabin, a closing degree of the door in closing the door may be inhibited from being insufficient (so-called door-ajar state).

The air-conditioning apparatus for a vehicle according to the above aspect does not return the mode of the inside-outside air switching unit immediately after the door is closed but returns the mode to the prior mode (the immediately previous mode to the issue of the command to perform switching to the intermediate mode) after waiting until the set time elapses. Thus, quietness in the vehicle cabin immediately after the occupant gets on the vehicle and closes the door is maintained, and the occupant who has got on the vehicle is not annoyed at sound related to driving of the inside-outside air switching unit.

Further, the air-conditioning apparatus for a vehicle according to the above aspect returns the mode of the inside-outside air switching unit to the prior mode after waiting until the set time elapses. Thus, even when plural occupants get on and off the vehicle, the above aspect may inhibit driving of the inside-outside air switching unit from being intermittently performed as in the technique disclosed in above Patent Literature 1 and may enable energy consumption of the vehicle to be lowered.

Consequently, the air-conditioning apparatus for a vehicle according to the above aspect may inhibit the closing degree of the door in closing the door from being insufficient, secure high quietness in the vehicle cabin immediately after the door is closed, and lower energy consumption of the vehicle.

Note that in the above, "the time set in advance" is a time that is set by experimentally and empirically calculating a time after the occupant gets on the vehicle and until he/she starts a certain action in the vehicle cabin, a time needed for plural occupants to get on the vehicle, and so forth.

As for the air-conditioning apparatus for a vehicle according to another aspect of the above embodiment, in the above aspect, the air-conditioning controller has a first timer and a second timer, the first timer starts time measurement after the door opening-and-closing detection unit detects the closed state of the door, the second timer starts time measurement after the first timer expires, the air-conditioning controller issues a command to the inside-outside air switching unit to return to a mode selected by the occupant when the second timer expires, and a time resulting from addition of a time from a start of the time measurement by the first timer to expiration and a time from a start of the time measurement by the second timer to expiration is the time set in advance.

The air-conditioning apparatus for a vehicle according to the above aspect is configured such that the air-conditioning controller has the first timer and the second timer and the second timer starts the time measurement after the first timer expires. Thus, after the total time of set times of both of the timers elapses after the occupant gets on the vehicle and closes the door, the inside-outside air switching unit returns to the prior mode.

Here, the set time of the first timer from the start of the time measurement to expiration is a time in which the occupant feels quietness immediately after he/she rides the vehicle, and the set time of the second timer from the start of the time measurement to expiration is a time needed for the other occupants to ride the vehicle after one occupant rides the vehicle. Note that both of the times are set based on experimental and empirical calculation.

As described above, in the air-conditioning apparatus for a vehicle according to the above aspect, the occupant who has rode the vehicle is not hindered from feeling quietness because two timers are used, and energy consumption of the vehicle may be lowered even when plural occupants ride the vehicle.

As for the air-conditioning apparatus for a vehicle according to another aspect of the above embodiment, in the above aspect, the air-conditioning apparatus further includes an ignition state detection unit detecting whether an ignition switch is in an ON state or an OFF state and sending information about the detection to the air-conditioning controller, the air-conditioning controller has a first timer and a second timer, the first timer starts time measurement after the door opening-and-closing detection unit detects the closed state of the door and finishes the time measurement in a case where the ignition switch becomes the ON state before expiration, the second timer starts time measurement after the first timer finishes the time measurement, the air-conditioning controller issues a command to the inside-outside air switching unit to return to a mode selected by the occupant when the second timer expires, and a time resulting from addition of a time from a start of the time measurement by the first timer to a finish of the time measurement and a time from a start of the time measurement by the second timer to expiration is the time set in advance.

The air-conditioning apparatus for a vehicle according to the above aspect is configured such that the air-conditioning controller has the first timer and the second timer and the second timer starts the time measurement after the first timer expires. However, in the above aspect, in a case where the ignition becomes the ON state during the time measurement by the first timer, the time measurement by the first timer is immediately finished, and the time measurement by the second timer is started. This is due to a fact that in a case where the occupant turns ON the ignition, the occupant does not have to be caused to feel quietness in the vehicle cabin. Thus, in the air-conditioning apparatus for a vehicle according to the above aspect, an unnecessary standby time (a standby time in the intermediate mode) may be shortened, and it is possible to earlier return the inside-outside air switching unit to a mode intended by the occupant.

As for the air-conditioning apparatus for a vehicle according to another aspect of the above embodiment, in the above aspect, a set time of the first timer from a start of the time measurement to expiration (first set time) is shorter than a set time of the second timer from a start of the time measurement to expiration (second set time).

In the air-conditioning apparatus for a vehicle according to the above aspect, the first set time is made shorter than the second set time. This is due to a fact that a time needed for the occupant who has rode the vehicle to feel quietness is shorter than a time until the other occupants complete riding the vehicle. Note that the difference between the first set time and the second set time is defined experimentally and empirically.

A control method of an air-conditioning apparatus for a vehicle according to one aspect of the present invention sets the air-conditioning apparatus as a control target, the air-conditioning apparatus including: an inside-outside air switching unit capable of switching among an outside air introduction mode for introducing air from an outside of a vehicle cabin of the vehicle, an inside air circulation mode for causing air in the vehicle cabin of the vehicle to circulate, and an intermediate mode for causing the outside of the vehicle cabin and an inside of the vehicle cabin of the vehicle to become a communicating state; a door opening-and-closing detection unit detecting an open-or-closed state of a door of the vehicle; and an air-conditioning control switch accepting selection by an occupant of the vehicle about switching of the outside air introduction mode and the inside air circulation mode, the control method including: an intermediate mode switching step of switching the inside-outside air switching unit to the intermediate mode in a case where the door opening-and-closing detection unit detects an open state of the door; a standby step of waiting until a time set in advance elapses in a case where the door opening-and-closing detection unit detects a closed state of the door in a state where a setting is made to the intermediate mode by execution of the intermediate mode switching step; and a mode returning step of returning the inside-outside air switching unit to an immediately previous mode to execution of the intermediate mode switching step after execution of the standby step.

In the control method of an air-conditioning apparatus for a vehicle according to the above aspect, the intermediate mode switching step is executed, and the intermediate mode is thereby maintained also when the door is closed. Thus, even in a vehicle with high air-tightness of a vehicle cabin, the closing degree of the door in closing the door may be inhibited from being insufficient (so-called door-ajar state).

In the control method of an air-conditioning apparatus for a vehicle according to the above aspect, the mode of the inside-outside air switching unit is not returned to the prior mode immediately after the door is closed but is returned to the prior mode (the immediately previous mode to execution of the intermediate mode) (the mode returning step is executed) after a wait for a lapse of the time set in advance (after execution of the standby step). Thus, quietness in the vehicle cabin immediately after the occupant gets on the vehicle and closes the door is maintained, and the occupant who has got on the vehicle is not annoyed at sound related to driving of the inside-outside air switching unit.

Further, in the control method of an air-conditioning apparatus for a vehicle according to the above aspect, the mode returning step is executed after execution of the standby step. Thus, even when plural occupants get on and off the vehicle, the above aspect may inhibit driving of the inside-outside air switching unit from being intermittently performed as in the technique disclosed in above Patent Literature 1 and may enable energy consumption of the vehicle to be lowered.

Consequently, the control method of an air-conditioning apparatus for a vehicle according to the above aspect may inhibit the closing degree of the door in closing the door from being insufficient, secure high quietness in the vehicle cabin immediately after the door is closed, and lower energy consumption of the vehicle.

Each of the aspects of the above embodiment may inhibit the closing degree of the door in closing the door from being insufficient, secure high quietness in the vehicle cabin immediately after the door is closed, and lower energy consumption of the vehicle.

The invention claimed is:

1. An air-conditioning apparatus for a vehicle, comprising:
an inside-outside air switching damper designed so as to switch among an outside air introduction mode for introducing air from an outside of a vehicle cabin of the vehicle, an inside air circulation mode for causing air in the vehicle cabin of the vehicle to circulate, and an intermediate mode for causing a flow path of air to form between the outside of the vehicle cabin and an inside of the vehicle cabin of the vehicle;
a door opening-and-closing sensor detecting whether a door of the vehicle is in an open state or in a closed state;
an air-conditioning control switch accepting selection by an occupant of the vehicle about switching of the outside air introduction mode and the inside air circulation mode; and
an air-conditioning controller accepting information about the detection from the door opening-and-closing sensor and information about the selection from the air-conditioning control switch, the air-conditioning controller issuing a command of a mode to be executed to the inside-outside air switching damper,
wherein the air-conditioning controller issues a command to the inside-outside air switching damper to perform switching to the intermediate mode in a case where the door opening-and-closing sensor detects the open state of the door and
the air-conditioning controller is configured to switch the inside-outside air switching damper to the intermediate mode, and to return to an immediately previous mode after a predetermined time period elapses if the door opening-and-closing sensor detects the closed state of the door after the inside-outside air switching damper switches to the intermediate mode.

2. The air-conditioning apparatus for a vehicle according to claim 1, wherein
the air-conditioning controller has a first timer and a second timer,
the first timer starts time measurement after the door opening-and-closing sensor detects the closed state of the door, wherein the first timer expires after a first predetermined time period,
the second timer starts time measurement after the first timer expires, wherein the second timer expires after the predetermined time period, and
the air-conditioning controller issues a command to the inside-outside air switching damper to return to the immediately previous mode selected by the occupant when the second timer expires.

3. The air-conditioning apparatus for a vehicle according to claim 1, wherein
the air-conditioning controller is configured to detect whether an ignition switch is in an ON state or an OFF state based on information sent from the ignition switch,
the air-conditioning controller has a first timer and a second timer,
the first timer starts time measurement after the door opening-and-closing sensor detects the closed state of the door and finishes the time measurement in a case where the ignition switch becomes the ON state before the first timer expires after a first predetermined time period,
the second timer starts time measurement after the first timer expires, wherein the second timer expires after the predetermined time period, and
the air-conditioning controller issues a command to the inside-outside air switching damper to return to the immediately previous mode selected by the occupant when the second timer expires.

4. The air-conditioning apparatus for a vehicle according to claim 2, wherein
the first predetermined time period is shorter than the predetermined time period.

5. The air-conditioning apparatus for a vehicle according to claim 2, wherein
the first predetermined time period is shorter than the predetermined time period.

* * * * *